United States Patent
Le Gal

(10) Patent No.: US 10,243,232 B2
(45) Date of Patent: Mar. 26, 2019

(54) ROTOLINEAR CLAMPING CYLINDER

(71) Applicant: BLUE SOLUTIONS, Ergue Gaberic (FR)

(72) Inventor: Guy Le Gal, Quimper (FR)

(73) Assignee: BLUE SOLUTIONS, Ergue Gaberic (FR)

( * ) Notice: Subject to any disclaimer, the term of this patent is extended or adjusted under 35 U.S.C. 154(b) by 559 days.

(21) Appl. No.: 14/898,719

(22) PCT Filed: Jun. 19, 2014

(86) PCT No.: PCT/EP2014/062956
§ 371 (c)(1),
(2) Date: Dec. 15, 2015

(87) PCT Pub. No.: WO2014/202728
PCT Pub. Date: Dec. 24, 2014

(65) Prior Publication Data
US 2016/0141708 A1 May 19, 2016

(30) Foreign Application Priority Data

Jun. 21, 2013 (FR) ...................... 13 55898

(51) Int. Cl.
*B23P 11/00* (2006.01)
*H01M 10/04* (2006.01)
(Continued)

(52) U.S. Cl.
CPC ......... *H01M 10/0404* (2013.01); *B25B 5/062* (2013.01); *F15B 15/063* (2013.01); *H01M 10/0468* (2013.01)

(58) Field of Classification Search
CPC .... B25B 1/00; B25B 1/08; B25B 1/14; B25B 5/00; B25B 5/02
See application file for complete search history.

(56) References Cited

U.S. PATENT DOCUMENTS 5,820,118 A  10/1998  Craft
5,996,984 A *  12/1999  Takahashi ................ B25B 5/16
                                              269/228
(Continued)

FOREIGN PATENT DOCUMENTS

JP      S5280396      6/1977
JP      H0626503      2/1994
JP      2010203470    9/2010

OTHER PUBLICATIONS

French Search Report, dated Mar. 19, 2014, French Application No. 1355898.

(Continued)

*Primary Examiner* — Lee D Wilson
(74) *Attorney, Agent, or Firm* — Womble Bond Dickinson (US) LLP

(57) ABSTRACT

The invention relates to a clamping cylinder (100) comprising a body (110) and a movable assembly (102) contained in a receiving chamber (112) of the body, rotatable and translatable relative to the body along a predetermined movement axis (V), the cylinder comprising guide means (142; 150) in order to guide the movable assembly between a clamping position and a free position. The guide means comprise: —at least one cylindrical roller (150A-150D) arranged on the body of the cylinder such that the axis of the roller is essentially perpendicular to the movement axis (V), —a rod (104) of the movable assembly extending along the movement axis and being configured so as to comprise at least one movement portion (142) having a polygonal section in a plane normal to the movement axis, the section comprising at least one rectilinear edge, the movement portion (142) being configured such that said section follows an essentially helical base line around the movement axis over at least a fraction (143) of the portion, the rod (104) and the (Continued)

Figure 1:
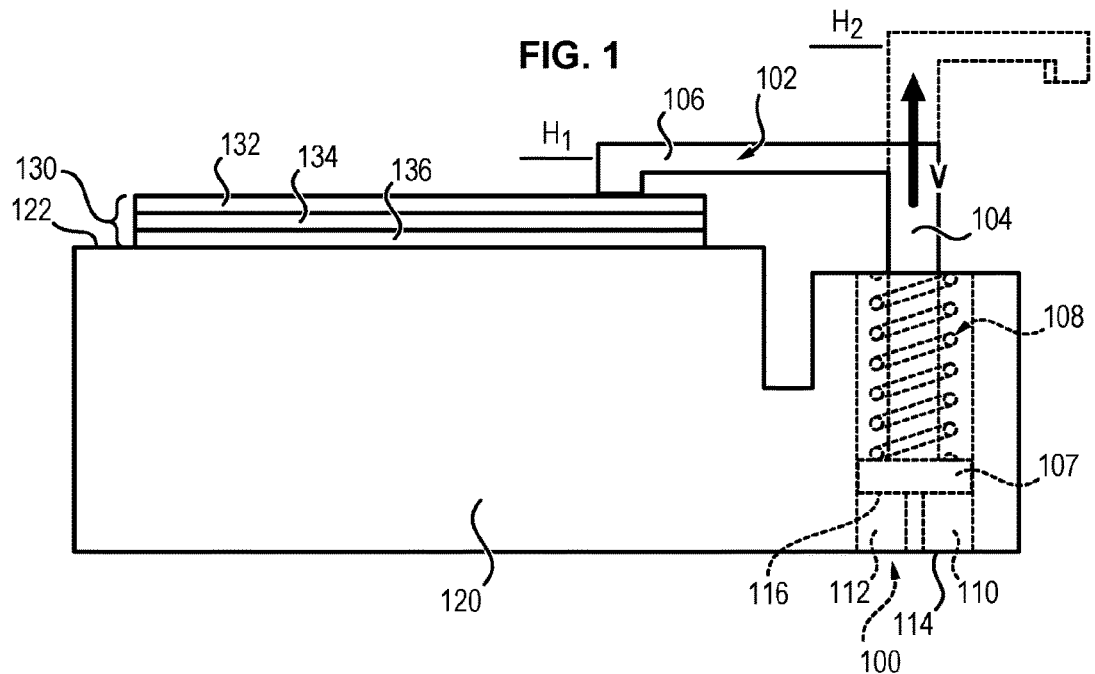

rollers (150A-150D) being positioned such that a roller is arranged across from each of the sides of the polygonal section.

20 Claims, 3 Drawing Sheets

(51) Int. Cl.
  *B25B 5/06*    (2006.01)
  *F15B 15/06*   (2006.01)

(56) References Cited

U.S. PATENT DOCUMENTS

| | | | |
|---|---|---|---|
| 6,698,736 B2 * | 3/2004 | Dugas | B25B 5/087 269/32 |
| 2003/0090046 A1 * | 5/2003 | Yonezawa | B25B 5/062 269/24 |
| 2003/0151183 A1 * | 8/2003 | Yokota | B23Q 17/002 269/25 |
| 2009/0038471 A1 | 2/2009 | Tanaka | |
| 2009/0152784 A1 * | 6/2009 | Yonezawa | B25B 5/062 269/32 |
| 2016/0141708 A1 * | 5/2016 | Le Gal | H01M 10/0404 29/623.1 |

OTHER PUBLICATIONS

International Search Report with English Language Translation, dated Sep. 26, 2014, Application No. PCT/EP2014/062956.

\* cited by examiner

ROTOLINEAR CLAMPING CYLINDER

The invention relates to a rotolinear clamping cylinder for clamping an element on a support.

A clamping cylinder generally comprises an L-shaped mobile assembly with a vertical rod and a horizontal arm located at the upper end of the rod and in a single piece with the latter. The rod is placed inside a body and mobile relative to said body in translation and in rotation, such that the mobile assembly can assume at least two positions relative to a horizontal support, specifically a clamping position wherein the arm is placed above a support adjacent to the cylinder at a first height so as to clamp an element on the support, and a release position wherein the end of the arm is placed at a distance from the support, at a second height greater than the first height.

Such a cylinder can be used in many applications and for example in a manufacturing method of a battery cell comprising a plurality of positive electrodes—or cathodes—and negative electrodes—or anodes—stacked, with possible interposition of a solid electrolyte (based on polymer especially). The cylinder in this case clamps the stack of different layers (anode, cathode and optionally electrolyte) to keep it on the support during transport of the already formed stack.

In the prior art, to produce the rotolinear movement of the cylinder, the latter is done as follows. The rod of the cylinder comprises guide grooves of helicoidal form over at least part of their travel. The body comprises balls fixed on its internal surface and intended to be in contact with the rod, the balls being placed in the different guide grooves. In this way, a ball cooperates with each groove so that displacement of the mobile assembly is done according to the trajectory imposed by the sliding of the ball in the guide groove when an action is applied to the mobile assembly according to the axis of displacement. The contact between the ball and the groove is quasi-intermittent.

But, since the balls are fixed relative to the body they do not roll in the grooves but rub on them when the mobile assembly is subjected to mechanical action as per the axis of displacement. Wear on the rod due to these frictional movements tends to create clearance between the ball and the groove, likely to perturb displacement of the rod and offset the position of the ball in the groove and therefore the angular position of the arm relative to the support when the mobile assembly is in clamping position. In this way, keeping the stack on the support, guaranteed by the angular position of the arm, is no longer ensured after a certain number of displacements of the rod because of the wear and of the damage to the grooves of the rod generated by the balls. Also, even before it reaches this stage, the angular position of the arm becomes random due to the multiplicity of places of contact possible between the balls and the grooves, which no longer detects the clamping or release position and blocks the automatic operation of some machines with which this cylinder cooperates. The aim of the invention is to rectify the disadvantages of the prior art by proposing a cylinder having a much longer shelf life.

For this purpose, the aim of the invention is a clamping cylinder comprising a body and a mobile assembly contained in a receiving chamber of the body, and mobile in rotation and in translation relative to the body according to a predetermined axis of displacement, the cylinder comprising guide means for guiding the mobile assembly between a clamping position wherein it has a first height and a first angular position according to the axis of displacement, and a release position wherein it has a second height and a second angular position according to said axis, said guide means comprising:
  at least one cylindrical roller arranged in the body of the cylinder such that the axis of the roller is essentially perpendicular to the axis of displacement,
  a rod of the mobile assembly extending essentially according to the axis of displacement and being configured so as to comprise at least one portion of displacement having a predetermined section according to a plane normal to the axis of displacement, the section comprising at least one rectilinear edge, the portion of displacement being configured such that said section follows a guide essentially helicoidal about the axis of displacement on at least one fraction of the portion, the rod and the roller(s) being positioned such that the or each of the rollers is facing the rectilinear edge or at least one of the rectilinear edges.

In keeping with the invention, the portion of displacement of the rod has a polygonal section and a roller is arranged facing each of the sides of the polygonal section.

"Roller" means a roller element of essentially cylindrical form, such a roller also being called "needle" by the person skilled in the art.

In this way, displacement of the rod of the cylinder occurs by cooperation of the roller or rollers arranged on the body and a face of the portion of the rod by following a contact no longer intermittent but linear. In this way, contact between rod and body is made over a larger surface and engenders less local pressure and less wear on the rod, decreasing the impact of the above problems or even eliminates said problems since it can be ensured not to reach a critical pressure marking the start of wear of the material from which the rod is made.

In this way, because of the invention the shelf life of a clamping cylinder is considerably increased.

Preferably, the invention also has the characteristics listed hereinbelow, taken singly or in combination:
  the portion of displacement of the rod has a square section and the guide means comprise four rollers, each of which is arranged facing one of the sides of the square section,
  the polygon can also be a triangle, a hexagon, etc. For optimisation of guidance and costs, the section is especially constituted by a square. In this way, the forces at the level of each contact are also reduced by multiplying said contacts, further limiting wear. Also, torque resisting torsion is substantial. This therefore produces a cylinder which has a shelf life at least one hundred times greater than that of a cylinder such as described in the prior art,
  the section of the portion of displacement is preferably symmetrical relative to the axis of displacement, this which balances the reaction forces and doubles the distance between the contact areas of the rod with the rollers creating the torque effect, for the same torque reducing forces and therefore the pressure applied to the rod,
  the rollers rest on a shoulder of the body, normal to the axis of displacement, preferably enclosing the mouthpiece of the receiving chamber,
  the roller(s) are optionally mounted so as to be free in rotation about their axis relative to the body, which allows them to roll on the surface of the rod and not cause friction. The forces applied to the contact surface of the rod and the wear of said rod are therefore decreased, the body comprises especially a shoulder, normal to the axis of displacement of the cylinder, preferably enclosing the mouthpiece of the receiving chamber, on which rests the roller(s), translation of the rollers is prevented at least in the plane normal to the axis of displacement, preferably also according to the axis of displacement, due to contact of the roller with the rod, the body and/or the adjacent rollers. The rollers are preferably mounted in a piece called a roller cage, attached to a piece of the body wherein the receiving chamber is arranged. This utilises a standard piece comprising the standard receiving chamber for designing the cylinder and lowers manufacturing costs, the shoulder forms a rim delimited by one or more walls extending according to the axis of displacement and having a section according to a plane normal to the axis of displacement following that of the portion of displacement, the rollers being in contact with the rod in the portion of displacement and the wall corresponding (preferably parallel to the edge of the portion of displacement), so as to block the translation of the roller according to the radial direction of the rod, the rollers are in contact at each of their longitudinal end with the or one of the walls of the body delimiting the shoulder or with an adjacent roller, preferably with the or one of the walls of the body at one of its longitudinal ends and with an adjacent roller at the other of its longitudinal ends, so as to block translation of the roller in its longitudinal direction, the shoulder can extend over the entire circumference of the receiving chamber and take up all the rollers, especially when the section of the rod in the portion of displacement is square. Each roller can be arranged such that its end wall (or base) at the level of a first longitudinal end is in contact with a side wall of an adjacent roller while its side wall is in contact at the level of its opposite longitudinal end with the wall of longitudinal end of an adjacent roller. The rollers are blocked by each other in translation in their longitudinal direction without the body having to be fitted with complex forms to achieve this, the body comprises a roller cage attached to the mouthpiece of the receiving chamber and comprising the rollers and the shoulder and optionally the vertical walls, the roller cage is made of steel, preferably treated so that its hardness is greater than 50 HRc, and a piece of the body comprising the receiving chamber is made of another material, such as aluminium, the rod and the roller(s) and the rod are made of metallic material, especially steel, preferably treated so that its hardness is greater than 50 HRc, preferably, at least one part of the body, especially the roller cage is also made of steel, surface treatment or core treatment can be applied to the rod or the or at least one of the rollers to boost the hardness of said roller or of the rod and further limit wear on these elements. Hardness greater than or equal to 50 HRc, obtainable by means of commercially available treatment, is enough to resist wear. The body and especially the roller cage are preferably also treated to improve its hardness, the part of the body housing the receiving chamber is made of another material, especially aluminium, standard, this part not being involved in the guide system.

The price and weight of the clamping cylinder according to the invention are reduced, in particular the roller cage is made of steel, preferably treated so that its hardness is greater than 50 HRc, and a piece of the body comprising the receiving chamber is made of another material, such as aluminium, the guide of the portion of displacement of the rod is helicoidal about the axis of displacement on a lower fraction of the portion of displacement and linear parallel to the axis of displacement on an upper fraction of the portion of displacement.

The clamping cylinder can also comprise the following characteristics:

the mobile assembly comprises an arm extending to the upper end of the rod according to a direction essentially perpendicular to the axis of displacement. It is especially in a single piece with the latter, the body of the cylinder is integral with a support comprising a supporting face essentially perpendicular to the axis of displacement, and the cylinder is configured such that, in the clamping position, the arm (located at the end of the rod) is at the vertical of the supporting face to a first height (which lets it be stopped against the supporting face or against an element placed on the latter), and in the release position, the arm is at a greater height (that is, over greater than the height of the arm in the clamping position), a free end of the arm located at a distance from the supporting face of the support according to a plane normal to the axis of displacement, the cylinder comprises a fluid inlet in the receiving chamber, such that fluid entering the chamber via the fluid inlet comes into contact with a stop face of the mobile assembly to push it towards its release position, this fluid inlet is capable of actuating displacement of the mobile assembly as far as the release position. The inlet sends a flow, especially an airflow, against a stop face of the mobile assembly, especially normal to the axis of displacement, the flow preferably moving essentially according to the axis of displacement. The stop face is especially the lower face of a piston located at the lower end of the rod, the cylinder comprises return means, especially elastic, of the mobile assembly to the clamping position, the return means consist of a spring located in the receiving chamber and associated on the one hand with the mobile assembly and on the other hand with the body.

alternatively, displacement of the mobile assembly of the cylinder can be actuated by means of a motor or any other means, the guide of the portion of displacement of the rod, intended to be in contact with the roller, is preferably helicoidal about the axis of displacement on a lower fraction of the portion of displacement and linear parallel to the axis of displacement on an upper fraction of said portion. In this way, from the release position corresponding to contact of the rollers on the lower end of the portion of displacement, the mobile assembly describes a first translation and rotation movement (helicoidal translation) then, when the arm is in an angular position identical to that of the clamping position the mobile assembly no longer carries out simple translation. In this way, the different elements can be clamped on the supporting face with the arm in a determined angular position, irrespective of the height of the elements stacked on the supporting face. This ensures proper holding of the elements on the supporting face despite a variation in the height of the elements placed on the supporting surface. The configuration of the cylinder is therefore highly adaptable and the latter can be used in different contexts.

Another aim of the invention is a clamping method of a stack of layers, especially layers intended to form an energy storage assembly, made by means of a cylinder according to the invention wherein the following steps are conducted:

the layers are stacked on a supporting face essentially normal to the axis of displacement of the cylinder of a support integral with the cylinder, while the mobile assembly is placed in a release position, the end of an arm located at an upper end of the rod being at a distance from the supporting face, the mobile assembly is shifted such that the latter assumes a clamping position wherein the arm is placed at the vertical of the supporting face, in contact with the upper end of the stack of layers.

The support is then preferably shifted to a predetermined station and the rod of the cylinder is shifted to a release position when the support reaches the predetermined station.

Figure 2:
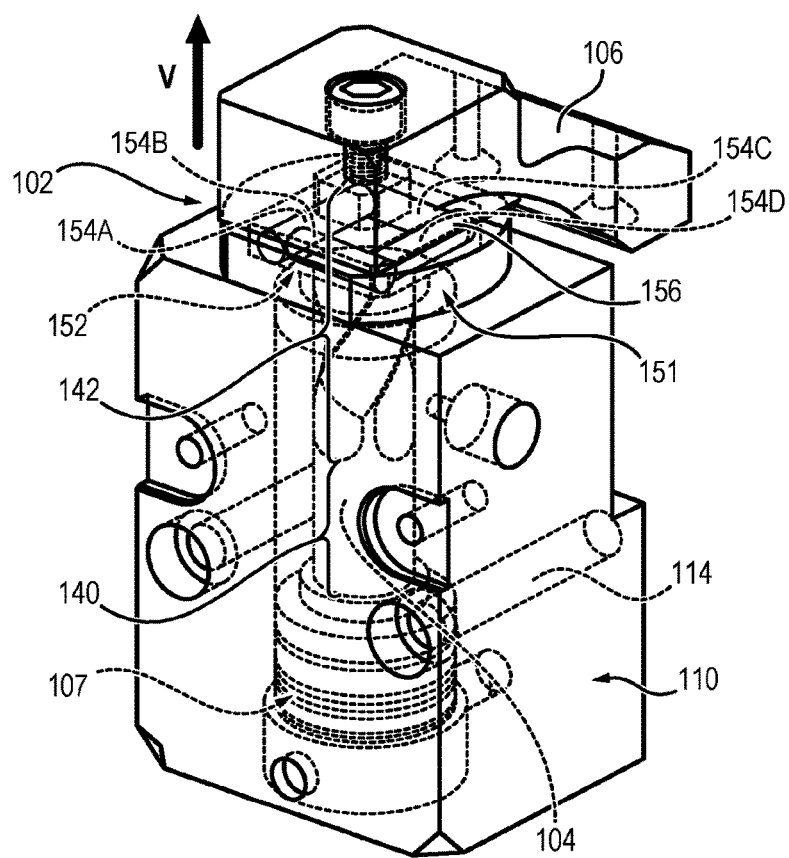
Figure 3:
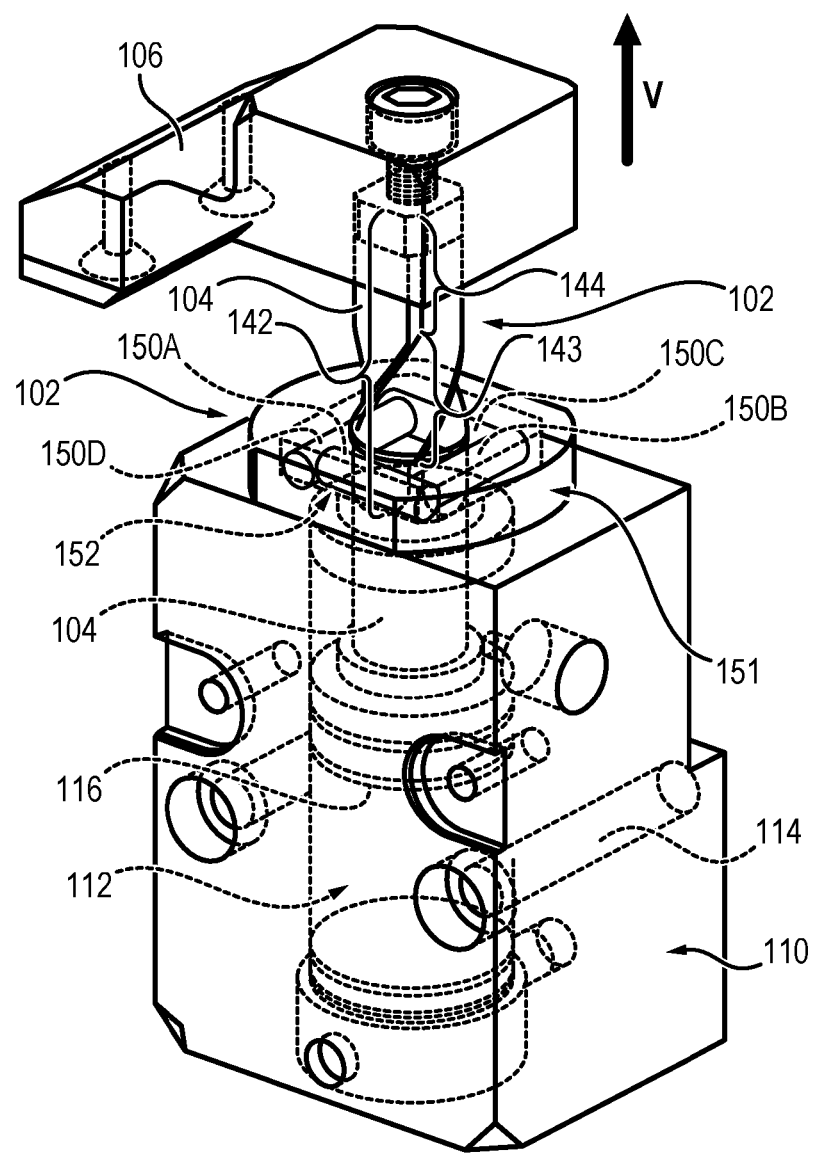
Figure 4A:
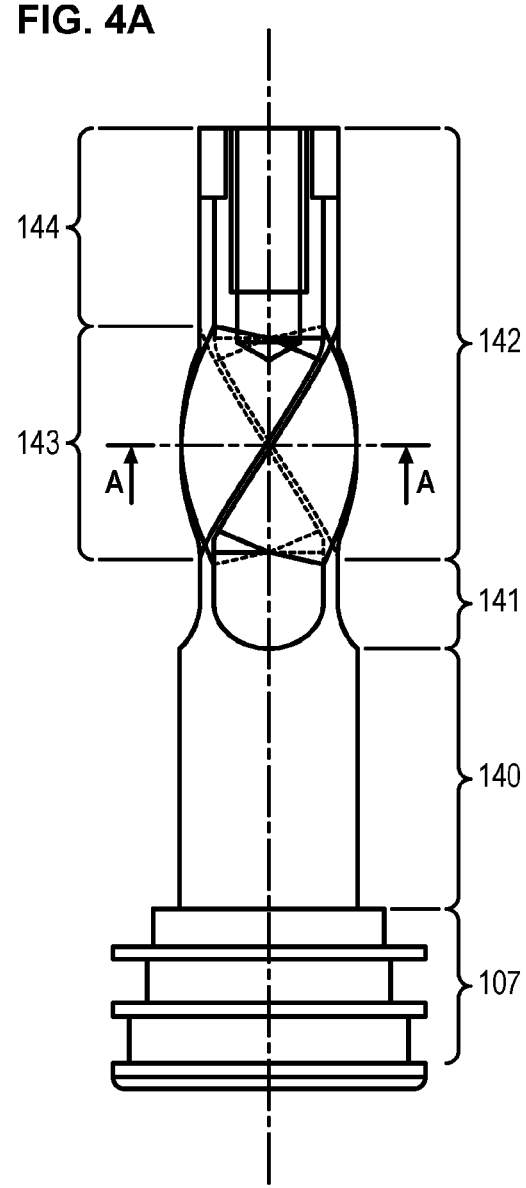
Figure 4B:
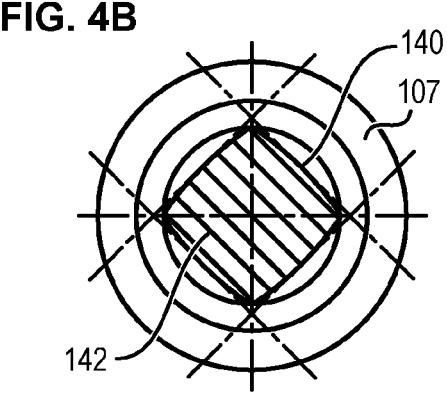

The invention will now be described as per the following detailed drawings which illustrate different embodiments of the invention and do not limit the invention, wherein:

FIG. 1 is a basic general diagram of a clamping cylinder according to the invention, FIG. 2 is a perspective view of the cylinder showing in particular the guide system of the cylinder when the cylinder is in a clamping position, FIG. 3 is the same view as that of FIG. 2 when the cylinder is in a release position, FIG. 4A is a perspective view of the rod and of the piston of the mobile assembly of the cylinder of FIGS. 2 and 3, FIG. 4B is a section according to A-A of the rod and of the piston of the mobile assembly of FIG. 4A.

FIG. 1 shows a clamping cylinder 100 according to the invention. As already explained, such a clamping cylinder can be used in many applications and in different contexts even if an application which is particularly pertinent for the applicant is an application in the field of energy storage and especially the stacking of different films comprising an energy storage element (especially anode, electrolyte and cathode, the anodes and cathodes being fitted with a current collector). The different films are in effect stacked on a support and once stacked are moved to another station of the assembly chain, for example to include the stack in a mechanical envelope. For this operation, at least one clamping cylinder according to the invention is used, which clamps the different stacked films during transport such that the stack is held without relative displacement of one of the layers between them and relative to the support as far as the following production station.

The clamping cylinder 100 for this purpose therefore comprises a mobile assembly 102 comprising a rod 104 extending according to a vertical axis of displacement V and an arm 106, located at the upper end of the rod 104 and essentially horizontal. The mobile assembly can also comprise a piston 107, of cylindrical profile and dimensions greater than those of the rod and located at the lower end of the rod 104. The directions described in the example do not of course limit the invention, and the axis of displacement can for example be horizontal. The mobile assembly is inserted in a receiving chamber 112 of a body of a cylinder 110 and is mobile relative to this body 110 in translation and in rotation according to the axis V.

The body 110 of the cylinder 100 is also integral with a support 120 comprising a supporting face 122 extending in a plane essentially horizontal and therefore normal to the axis of displacement V of the cylinder. This support 120 is intended to receive a stack 130 of layers of batteries for example, especially a layer of cathode 132, a layer of electrolyte 134 and a layer of anode 136, forming an elementary battery. Evidently, the number of layers of the stack is not limited to the number indicated hereinabove, the nature of the object or objects to be clamped not being limited to the above either.

The clamping cylinder 100, which keeps the stack in position on the supporting face 122 of the support 120 is configured such that the mobile assembly 102 can be mobile between a clamping position, shown in full lines in FIG. 1, and a release position, shown in dotted lines in this figure. In the clamping position the arm 106 is at the vertical of the support 120, at a first height H1, such that it is stopped against the stack 130 to clamp the latter against the support and keep its position on the support. In the release position the arm 106 is in a angular position wherein the end of the arm 106 is away from the support according to a plane normal to the axis of displacement V, specifically it is not located at the vertical of the latter, and is at a height H2 greater than the height of the stack 130. When the cylinder is in this position the space above the support is free and easily stacks the different layers due to the presence of the arm.

To maintain the clamping position the cylinder comprises elastic means, especially a spring 108 in compression positioned in the receiving chamber 112 of the body 110 whereof an end (the upper end) is supported on the body (or linked to it), on a surface delimiting the receiving chamber 112 at the upper end of the latter and the other end (lower end) is supported on the mobile assembly (or linked to it), especially on the upper face of the piston 107. To move the mobile assembly from the clamping position to the release position, the cylinder comprises an air inlet 114 in the lower part of the body and in fluid communication with the receiving chamber 112 of the body, sending a flow of compressed air into the chamber, which pushes on a stop surface 116 of the piston 107 normal to the axis of displacement. The thrust of the air on the stop surface 116 combats the action of the spring 108 and moves the mobile assembly from the clamping position to the release position. This air inlet 114 communicates generally with an air outlet of a station corresponding to a station of the manufacturing chain, the air being sent to the stowing air inlet 114 of the support on said station.

The cylinder and more particularly the guide system of the cylinder according to an embodiment of the invention will now be described by means of FIGS. 2 to 4. As is evident from FIGS. 2 and 3 the rod 104 comprises a first portion 140 having a circular section in a plane normal to the axis of displacement, of dimensions less than those of the piston, and a second portion 142, or displacement portion, of square section in this plane. In the displacement portion, the rod comprises a first fraction 143, or lower fraction, closer to the first portion 140, wherein the guide, according to which the section is developed, is helicoidal about the axis of displacement of the body. It also comprises a second fraction 144, or upper fraction, for which the guide, according to which the section is developed, is parallel to the axis of displacement V of the cylinder.

The square section is sized in the circular rod such that the dimension of the side of the square of the portion 142 is less than the diameter of the rod in the portion 140. It is clear that the rod comprises a transition portion 141 between the portions 140 and 142 enabling progressive passage of the circular section to the square section.

The chamber 112 has a circular section complementary to the section of the piston 107. The mouthpiece of the chamber therefore also has a circular section and dimension greater than those of the rod in the portions 140 and 142.

The cylinder also comprises four cylindrical guide rollers 150A-150D, each roller being intended to be in contact at the level of its side wall with one of the sides of the rod in its portion 142 of square section according to a contact line extending in a horizontal direction. Each roller is more particularly positioned in a roller cage 151 attached to a piece wherein the chamber 112 is arranged, especially on a shoulder 152 of the cage forming a rim enclosing the mouthpiece of the receiving chamber 112 and located in the vicinity of the upper end of the body of the cylinder.

The body 110 and especially the roller cage 151 is configured such that vertical faces 154A-154D enclose the shoulder and in the vicinity of the mouthpiece of the receiving chamber 112 delimit an inner housing located above the receiving chamber, of a size greater than the receiving chamber and of a section similar to that of the rod in its portion of displacement in the plane normal to the axis of displacement, specifically square. The rod is placed in the receiving chamber 112 such that, in its portion of displacement 142, the sides of the rod are parallel to the faces 154A-154D.

Each roller 150 is blocked in translation between an essentially vertical face 154 of the roller cage 151 and a corresponding side of the rod 104 and by the adjacent rollers, according to the plane normal to the axis of displacement.

The body of the cylinder and especially the roller cage is in effect configured such that the space between each of the walls 154 and the side corresponding of the rod 104 in the portion of displacement is just sufficient to take up a roller. The roller 150 is in contact at the level of its side wall with the rod 104 in its portion of displacement 142 and the body on the face 154, blocking its translation according to the radial direction of the rod. It is clear that the rod is therefore blocked without clearance between the four rollers and is not offset, even if the mouthpiece of the receiving chamber 112 does not have a form complementary to that of the rod 104 in its portion of displacement.

In its longitudinal direction, the roller 150A-150D is in contact at one of its longitudinal ends, said first end, with a wall 154B-154A of the cage 151 perpendicular to that with which its side wall is in contact and, at the other of its longitudinal ends, said second end, with the side wall of one of the adjacent rollers 150D-150C. The roller 150 is blocked in translation according to its longitudinal direction. It is evident that the side wall of the roller 150A-150D is in contact on its side wall in the vicinity of its first longitudinal end with the longitudinal end of the other adjacent roller 150B-150A, also blocking translation of said other adjacent roller 150B-150A in the longitudinal direction of this roller.

The body 110, especially the roller cage, also comprises a return 156 parallel to the shoulder 152 and therefore essentially horizontal and positioned at the upper end of the faces 154A-154D such that the space between the walls 152 and 156 is just sufficient to take up the rollers 150, the latter being in contact at the level of their side wall with the walls 152 and 156 of the roller cage, blocking their translation according to the axis of displacement. In this way, even if they are not fixed to the body due to their positioning, the rollers are not mobile relative to the body, especially to the roller cage.

The rollers and the rod are made of metal, especially steel, and treated to improve their mechanical properties, especially their hardness, to limit wear on these elements. The hardness of the rollers and of the rod is more particularly greater than 50 HRc. The roller cage 151 is also made of treated steel while the piece comprising the receiving chamber 112 is made of aluminium, which lowers the manufacturing costs of the cylinder. This receiving piece can also be standard for any type of cylinder.

Displacement of the mobile assembly from the release position (shown in FIG. 3) to the clamping position (shown in FIG. 2) will now be described. It is evident that the mobile assembly is held in release position by the compressed air sent against a stop face 116 of the piston 107. This position of the assembly 102 corresponds to that wherein the lower end of the portion of displacement 142 is in contact with the rollers 150A-150D. When the aim is to shift from the release position to the clamping position the diffusion of compressed air is halted. The spring 108 in compression tends to return to its slack length and tends to return the rod to the body. When the mobile assembly shifts from the release position to the clamping position it first follows a helicoidal trajectory (rotation and translation according to the axis of displacement of the cylinder) with each roller which rolls against a side of the rod in the fraction 143 of the portion of displacement 142 so as to modify the angular position of the rod (by a quarter turn) and modifying the height of the arm 106, then, once the prescribed angular position is attained and the roller is in contact with the second fraction 144 of the portion of displacement 142, the rod takes a vertical linear trajectory until the arm 106 stops against the clamp elements against the supporting face 122 of the support 120.

The clamping cylinder according to the invention is of course not limited to the embodiment described here. It could for example be formed according to the following variants:

- the section of the cylinder in its portion intended to be in contact with the rollers is not necessarily square. It could have another polygonal section or with at least one rectilinear edge, preferably several rectilinear edges, to make contact with the roller or the corresponding rollers. The number and the disposition of the rollers would if needed of course be adapted as a function of the section of the rod of the cylinder,
- the rod could comprise a section with at least one rectilinear edge over its entire dimension according to the axis of displacement and not only over a portion of the latter,
- the rollers could be mounted, especially articulated in rotation on the body of the cylinder, which would limit the friction between the rollers and the body,
- the body of the cylinder could be made in a single piece,
- the guide of the guide section could be different to what is described here, for example helicoidal over its entire travel,
- the means for holding the clamping and release positions can also be different to what is described here. The cylinder could even be devoid of elastic means, the action of gravity letting it return to the clamping position. The cylinder can also if needed be fitted with a motor which controls displacement of the mobile assembly according to the axis of displacement.

The invention claimed is:

1. A clamping cylinder comprising a body and a mobile assembly contained in a receiving chamber of the body, mobile in rotation and in translation relative to the body according to a predetermined axis of displacement, this mobile assembly comprising a clamp arm, the cylinder comprising guide means for guiding the mobile assembly between a clamping position wherein this mobile assembly has a first height and a first angular position according to the axis of displacement and a release position wherein this mobile assembly has a second height and a second angular position according to said axis, said guide means comprising:
- at least one cylindrical roller arranged in the body of the cylinder such that the axis of the roller is essentially perpendicular to the axis of displacement,
- a rod of the mobile assembly extending essentially according to the axis of displacement and being configured so as to comprise at least one portion of displacement having a predetermined section according to a plane normal to the axis of displacement, the section comprising at least one rectilinear edge, the portion of displacement being configured such that said section follows an essentially helicoidal guide about the axis of displacement on at least one fraction of the portion, the rod and the roller(s) being positioned such that the or each of the rollers is facing the or at least one of the rectilinear edges,
- wherein the portion of displacement of the rod has a polygonal section, and in that a roller is arranged facing each of the sides of the polygonal section.

2. The clamping cylinder according to claim 1, wherein the portion of displacement of the rod has a square section and in that the guide means comprise four rollers each of which is arranged facing one of the sides of the square section.

3. The clamping cylinder according to claim 1, wherein the section of the portion of displacement is symmetrical relative to the axis of displacement.

4. The clamping cylinder according to claim 1, wherein the rollers rest on a shoulder of the body, normal to the axis of displacement, enclosing the mouthpiece of the receiving chamber.

5. The clamping cylinder according to claim 4, wherein translation of the rollers is prevented at least in the plane normal to the axis of displacement, and also according to the axis of displacement, due to contact of the roller with the rod, the body and/or the adjacent rollers.

6. The clamping cylinder according to claim 4, wherein the shoulder forms a rim delimited by one or more walls extending according to the axis of displacement and having a section according to a plane normal to the axis of displacement following that of the portion of displacement, the rollers being in contact with the rod in the portion of displacement and the corresponding wall so as to block translation of the roller according to a radial direction of the rod.

7. The clamping cylinder according to claim 6, wherein each said roller is in contact at each of a longitudinal end with the or one of the walls of the body delimiting the shoulder or with another adjacent roller.

8. The clamping cylinder according to claim 4, wherein the body comprises a roller cage attached to the mouthpiece of the receiving chamber and comprising the rollers and the shoulder and optionally vertical walls of the body delimiting the shoulder.

9. The clamping cylinder according to claim 8, wherein the roller cage is made of steel, and a piece of the body comprising the receiving chamber is made of another material.

10. The clamping cylinder according to claim 1, wherein the rollers and the rod are made of metallic material.

11. The clamping cylinder according to claim 1, wherein the guide of the portion of displacement of the rod is helicoidal about the axis of displacement on a lower fraction of the portion of displacement and linear parallel to the axis of displacement on an upper fraction of the portion of displacement.

12. The clamping cylinder according to claim 1, wherein the clamp arm extends to the upper end of the rod according to a direction essentially perpendicular to the axis of displacement.

13. The clamping cylinder according to claim 12, wherein the body is integral with a support comprising an essentially perpendicular supporting face of the axis of displacement, the cylinder being configured such that, in the clamping position, the arm is at the vertical of the supporting face at a first height and that, in the release position, the arm is at a greater height, a free end of the arm being at a distance from the supporting face of the support according to a plane normal to the axis of displacement.

14. The clamping cylinder according to claim 1, wherein the clamping cylinder comprises a fluid inlet in the receiving chamber, such that fluid entering the chamber via the fluid inlet comes into contact with a stop face of the mobile assembly so as to push the mobile assembly towards the release position.

15. The clamping cylinder according to claim 1, wherein the clamping cylinder comprises return means of the mobile assembly in the clamping position.

16. The clamping cylinder according to claim 15, wherein the return means consist of a spring located in the receiving chamber and connected on the one hand to the mobile assembly and on the other hand to the body.

17. A method for clamping a stack of layers, especially layers intended to form an energy storage assembly, performed by means of a cylinder, according to claim 1, wherein the following steps are performed:
- the layers are stacked on a supporting face essentially normal to the axis of displacement of the cylinder of a support integral with the cylinder, while the mobile assembly of the cylinder is placed in a release position, the end of an arm located at an upper end of the rod being at a distance from the supporting face,
- the mobile assembly is shifted such that the latter assumes a clamping position wherein the arm is placed at the vertical of the supporting face, in contact with the upper end of the stack of layers.

18. The clamping cylinder according to claim 7, wherein each roller is in contact at one of a longitudinal end with the or one of the walls of the body and at the other of a longitudinal end with another adjacent roller.

19. The clamping cylinder according to claim 9, wherein the roller cage is made of steel, treated so that the hardness of said steel is greater than 50 HRc.

20. The clamping cylinder according to claim 10, wherein the rollers and the rod are made of steel, treated so that the hardness of said steel is greater than 50 HRc.

* * * * *